No. 773,417. PATENTED OCT. 25, 1904.
A. POHORZELECK.
MACHINE FOR MAKING WICKERWORK.
APPLICATION FILED NOV. 10, 1902.
NO MODEL. 3 SHEETS—SHEET 1.

No. 773,417. PATENTED OCT. 25, 1904.
A. POHORZELECK.
MACHINE FOR MAKING WICKERWORK.
APPLICATION FILED NOV. 10, 1902.
NO MODEL. 3 SHEETS—SHEET 2.

No. 773,417. PATENTED OCT. 25, 1904.
A. POHORZELECK.
MACHINE FOR MAKING WICKERWORK.
APPLICATION FILED NOV. 10, 1902.
NO MODEL. 3 SHEETS—SHEET 3.

Witnesses
Thos. Kirkpatrick
H. van Heerenbrinck

Inventor
Arno Pohorzeleck
by H. van Oldeneel
Attorney

No. 773,417.

Patented October 25, 1904.

UNITED STATES PATENT OFFICE.

ARNO POHORZELECK, OF OSCHATZ, GERMANY.

MACHINE FOR MAKING WICKERWORK.

SPECIFICATION forming part of Letters Patent No. 773,417, dated October 25, 1904.

Application filed November 10, 1902. Serial No. 130,791. (No model.)

*To all whom it may concern:*

Be it known that I, ARNO POHORZELECK, a subject of the King of Saxony, residing at 1 Alte Oschatzerstrasse, Oschatz, in the Kingdom of Saxony and Empire of Germany, have invented new and useful Improvements in Machines for Making Wickerwork, of which the following is a specification.

My invention relates to machines for making wickerwork.

It has been proposed to make wickerwork by alternately bending backward and forward the required straight elements or stakes, somewhat in the manner of the warp-threads in a loom, so that after each such change the flexible elements or withes can be laid in and pushed down between them, so as to form the wickerwork. The change in the position of the first-named stakes was effected in such method by means of cords having eyes or loops through which the stakes were passed and by means of which they were bent backward and forward.

According to the present invention for the cords provided with eyes or loops spring-teeth or grippers or properly-shaped springs arranged in rows are substituted, which by their working bend the stakes from their normal position, and so form the shed in which the withes can be laid and pressed down.

The arrangement in the method of construction now to be described is especially applicable to the making of basket-bottoms and angular baskets—for example, traveling-hampers—and some modified forms are shown in the accompanying drawings, in which—

Figure 1:
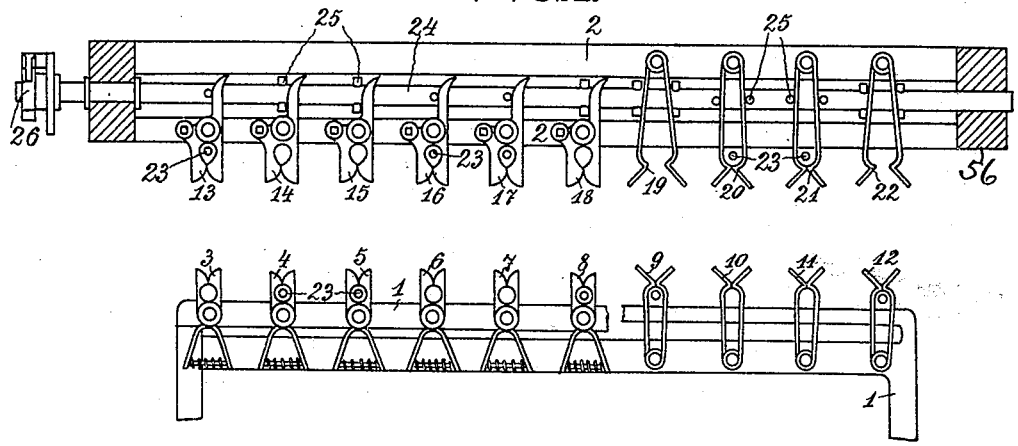
Figure 2:
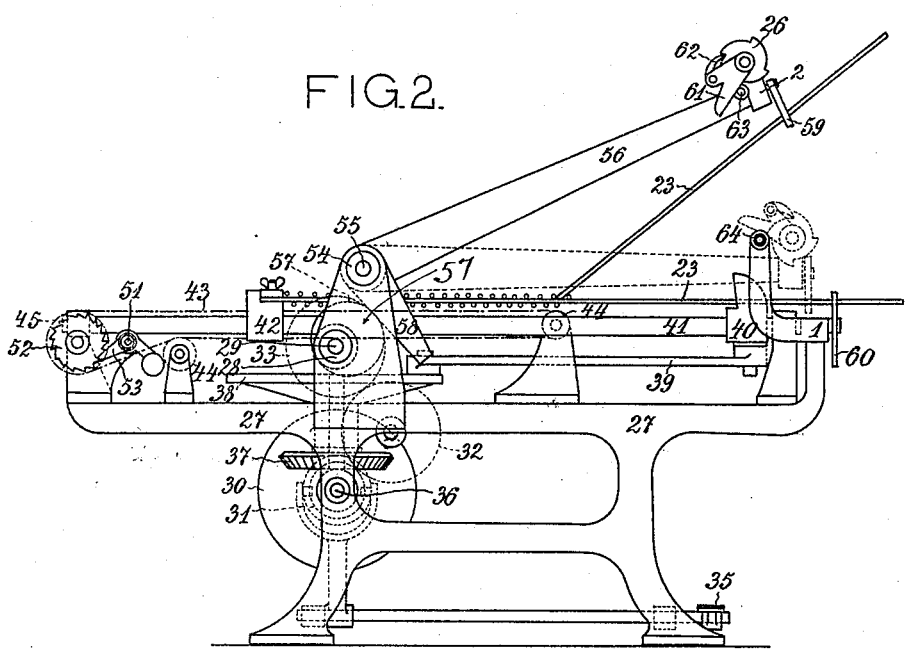
Figure 3:
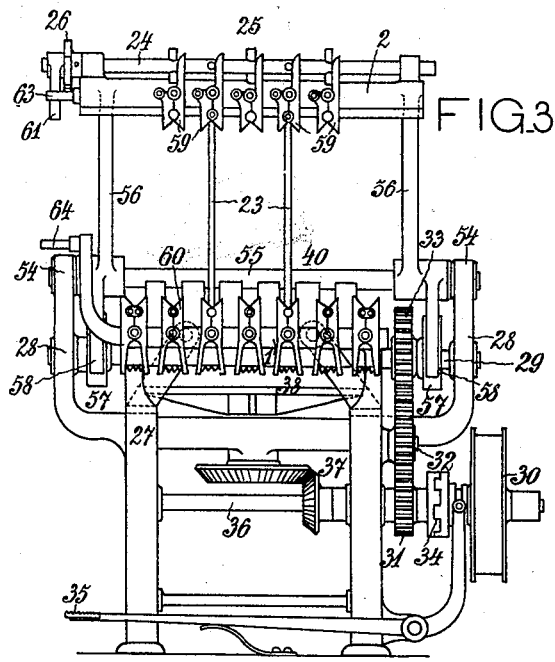
Figure 4:
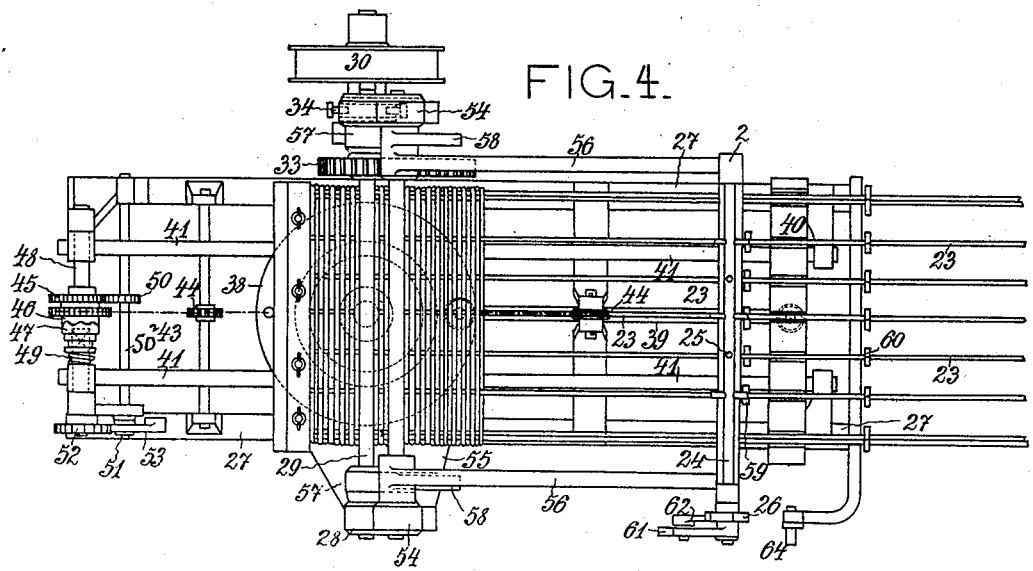
Figure 5:
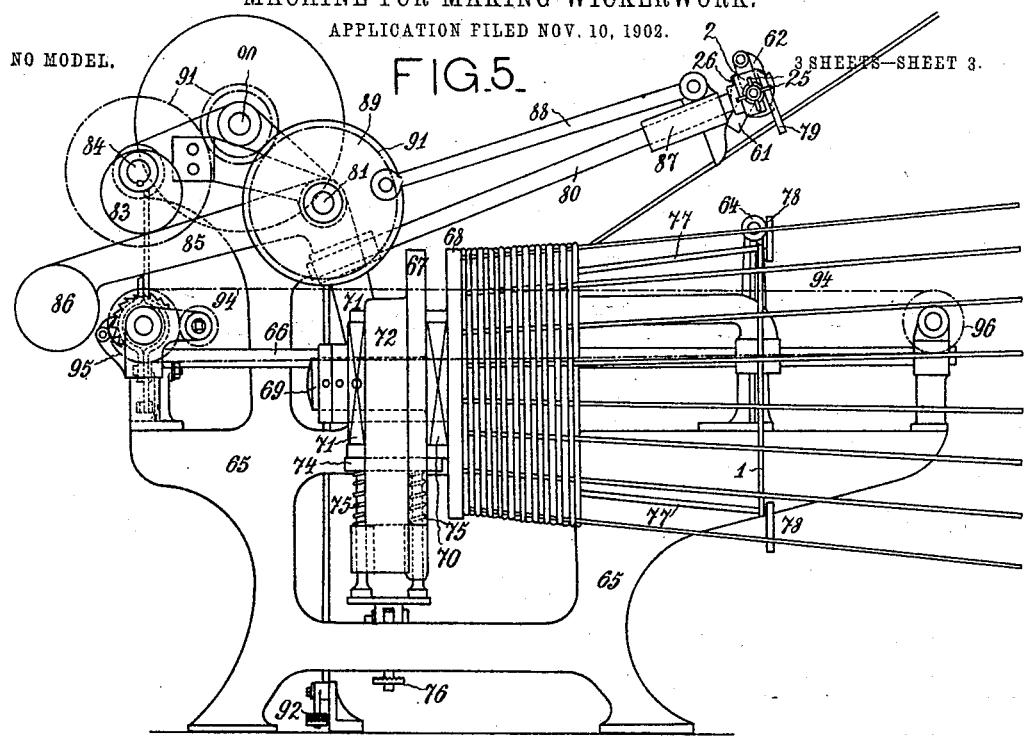
Figure 6:
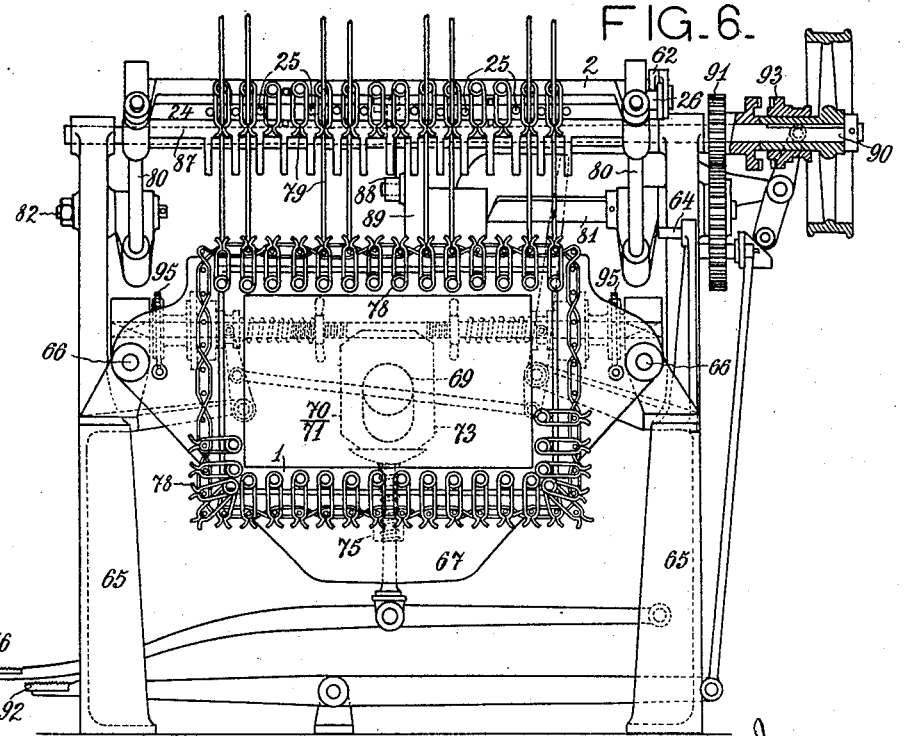

Figure 1 shows the position of the straight pieces or stakes and the movable gripping teeth or springs which catch and hold them. Figs. 2, 3, and 4 are side, front, and top views of a machine for making flat basket-bottoms. Figs. 5 and 6 are side and front views of a machine for making hampers, rectangular in plan.

Upon a fixed rail or frame 1 and a movable one 2 gripping-teeth 3 to 8 or springs 9 to 12 and gripping-teeth 13 to 18 or springs 19 to 22, respectively, are fixed. In Fig. 1 two forms of gripping devices are shown, those at the left being termed "gripping-teeth" and those at the right "gripping-springs," and either form may be employed. The stakes 23 are held by means of the gripping-teeth 3 to 8 and the springs 9 to 12 upon the fixed rail 1, the force of the springs being so proportioned that the stakes can be drawn away from them by the gripping-teeth 13 to 18 and the springs 19 to 22 if, in the first place, the movable rail 2 is moved to and from the fixed rail 1, and, secondly, the gripping-teeth 13 to 18 and the springs 19 to 22 are opened by an arrangement described later on as soon as they are brought in contact with the stakes which are in the gripping-teeth 3 8 and the springs 9 12.

In the position shown in Fig. 1 the teeth 13 16 17, as well as the springs 20 and 21 on the movable rail 2, are closed and have taken the stakes 23 from the corresponding gripping-teeth 3 6 7 and the springs 10 11 on the fixed rail 1, so that now only the teeth 4, 5, and 8 and the springs 9 and 12 on the fixed rail 1 retain their stakes. The shed or place for the cross-withes to be inserted in is therefore now formed by the stakes in 13, 16, 17, 20, and 21 on the one side and in 4 5 8 9 12 on the other side. The regulation of the action of the gripping-teeth and of the springs on the loose rail 2 is effected in the following way: In bearings on the rail 2 the axle 24 revolves, on which cams or projections 25 are arranged. One end of the axle 24 carries a four-toothed wheel 26, which in the lowest position of the rail 2 is turned partly round or automatically turns itself, (see below,) so that as the cams 25 are arranged upon the axle 24 in a position corresponding with the desired movements of the stakes to leave the space or shed for the cross-withes at each further quarter-revolution of the axle corresponding stakes 23 are drawn out from the gripping-teeth 3 to 8 and the springs 9 to 12. In the position shown in Fig. 1 the gripping-teeth 13 16 17 and the springs 20 21 are opened by the cams 25 at the moment when they have moved above the stake 23 in the gripping-teeth 3 6 7 and the springs 10 11 on the fixed rail 1, so that when the rail 2 goes up again the stakes 23, taken by 13 16 17 21, overcome the force of the springs of the gripping-teeth 3 6 7 and of the springs 10 11 and follow the movement of the rail 2.

The construction of the gripping-teeth and of the springs can be varied as desired, and modified forms of teeth and springs may be substituted for them.

The use of the above-described arrangement for the preparation of flat bottoms for baskets is shown, by way of example, in Figs. 2 to 4.

On the frame 27 the axle 29 turns in bearings 28 and is driven by the belt-pulley 30 by means of the toothed wheels 31, 32, and 33. By a coupling 34 and a foot-lever 35 the machine can be thrown in and out of gear. The driving-shaft 36, (with the pulley 30, the toothed wheel 31, and the coupling 34,) drives, by means of the toothed wheels 37, the crank-disk 38, which by means of the connecting-rod 39 drives the beating-bar 40 backward and forward on the bars 41 of the frame 27. The beater 40 serves to drive the weft material or withes into the space or shed prepared for it between the stakes 23. On the bars 41 also slides a clamping arrangement 42, which firmly holds one end of the stakes 23 and which also allows the finished wicker-work to move forward by degrees on the bars 41 toward the back of the machine. For this purpose the chain 43 is attached to the clamping device 42 and is led over the rollers 44 and the roller or chain-wheel 45, which are carried by the frame 27. The roller 45 carries on one side one part 46, Fig. 4, of a brake or friction coupling, the other adjoining part of which, 47, is movable endwise upon the squared part of a rod 48, fixed to the frame 27, and is pressed out by a spring 49. The pressure caused by the spring 49 between the two parts 46 and 47 serves for regulating the tightness or looseness of the wickerwork, as the greater the pressure between the two parts 46 and 47 the greater is the resistance to the backward movement of the clamp 42 on the bars 41 and to the action of the beater-bar, and consequently the wickerwork is the more closely formed. If the brake is released by shifting the movable member 47 away from the member 46 in the usual way, the chain-wheel 45 can be turned back and the clamp 42 returned to its original position in the front part of the machine, when fresh stakes can be inserted and clamped for the recommencement of work. For this purpose the axle 50² of the gear-wheel 50 is provided with a square end 51 (see Fig. 2) to receive a handle (not shown) by which said shaft may be rotated.

Above the axle 29 a spindle 55 turns in bearings 54 and carries arms 56, to the outer end of which is fixed the rail 2, which by means of the eccentric 57 on the spindle 29 and the lever 58 is driven up and operated. The rail 2 carries the gripping-teeth 59, which correspond with those 13 to 18 and the spring-clips 19 to 22 in Fig. 1. On the rail 1, fixed to the frame 27, are carried the gripping-teeth 60, corresponding with those 3 to 8 and the springs 9 to 12 in Fig. 1.

The shifting of the axle 24 with the cams 25 for adjusting the position of the teeth 59 on the movable rail 2 is effected by the carrier-arm 61, which carries the ratchet-pawl 62, gearing with the ratchet-wheel 26, and rests upon the projection 63 on the rail 2. This arm 61 at the downstroke of the arms 56 strikes the stop 64 on the rail 1, so that the ratchet-wheel takes the position shown in dotted lines in Fig. 2. At every downstroke of the rail 2 the axle 24 is turned through ninety degrees, so that the stakes which were raised are brought down and those which were down are taken up, and by the continuous changes the positions requisite to form the shed to receive the withe of the wicker-work are insured.

The machine shown in Figs. 5 and 6 consists of the following arrangement for making the rectangular baskets. On the frame 65 slides on the bar 66 a vertical plate 67, which is provided with an arrangement for carrying a second plate 68, which holds the basket-bottom and the wickerwork. The plate 68 has upon one side a cylindrical projection 69 and a rectangular plate 70, having its corners rounded, Fig. 6, while a second rectangular plate, 71, is fixed upon the pin or stud 69, which can move vertically in the slit or opening 73 in the plate 67 and its projection 72, so that the middle of the basket may be brought to different heights, and the upper row of stakes, on which the process for making the wickerwork by interlacing withes takes place, can always be adjusted at the same height. The size and shape of the rectangle is therefore determined in proportion to the size and shape of the basket to be made. Against the rectangular plates 70 and 71 a plate 74 presses, the spindle of which passes through the plate 67 and its projection 72 and is pressed up by the spring 75, while by pressure on the foot-pedal 76 the pressure of the spring 75 is overcome and the plate 74 is withdrawn from the rectangular plates 70 and 71, and the plate 68, together with the wickerwork upon it, can be turned round, so that another side of the basket can be worked on. On the rail or frame 1, which is firmly connected with the plate 68 by the rods 77 passing back through the bottom of the basket, are arranged according to the shape of the basket springs (or gripping-teeth) 78, which correspond with the gripping-teeth 3 to 8 and the springs 9 to 12 of Fig. 1, while the spring 79 on the rail 2 takes the place of the gripping-teeth 13 to 18 and the springs 19 to 22 of Fig. 1. In Figs. 5 and 6 the separate springs are for clearness omitted. The ends of the chains 94 are attached to the plate 67, and the chains pass over the rollers or wheels 95 and 96, of which those 95 are provided with braking devices exactly in the same way and for the same purpose as in the case of those 45 already described, Figs. 2 to 4. The rail 2 is carried at the end of arms 80, which can oscillate round the short spindle 81 or the bolt 82 in the frame 65 by the action of the eccentric 83, fixed on the shaft 84. The eccentric 83 is pressed against the arm 85, carrying weight 86 for balancing the movable frame 2 at the ends of the arms 80 and placed at right angles to the arms which carry the latter arms 80. The adjustment of the spindle 24, which carries the cams 25, is also in this case effected by a ratchet-wheel 26, Fig. 5, the pawl of which, 62, strikes with its end 61 against the stop 64 on the frame 65 when the arms 80 and the rail 2 go down. The arms 80 are so formed that they act as guides for the beater 87, by which the wickerwork is pressed together, and which is operated by means of the connecting-rod 88, driven by the crank-disk 89 upon the end of the shaft 81. The working of both shafts 81 and 84 is effected from the shaft 90 by means of toothed gears 91, and the machine is thrown into gear when desired by the pedal-lever 92 operating the coupling 93 and remains in gear as long as the pressure on the lever continues.

What I claim as my invention, and desire to secure by Letters Patent, is—

1. In a machine for making wickerwork, a fixed frame, grippers carried by the same for holding the stakes, a movable frame and grippers carried by the latter for displacing some of the stakes in the formation of the shed, substantially as and for the purpose described.

2. In a machine for making wickerwork, a movable frame, grippers carried by the same, a shaft, projections on said shaft for closing the grippers of the said frame, substantially as and for the purpose described.

3. In a machine for making wickerwork, a movable frame, grippers carried by the same, a shaft, projections on this shaft for closing the grippers of such frame, and a four-toothed wheel fixed upon the said shaft and adapted to turn the latter in every movement of the said frame, substantially as and for the purpose described.

4. In a machine for making wickerwork, a fixed frame, grippers carried by the same, a movable frame, grippers carried by the latter, arms forming guides and carrying the said movable frame, and an eccentric for actuating this movable frame, substantially as described.

5. In a machine for making wickerwork, a movable frame, grippers carried by the same, guide-bars, and a clamp for the stakes and the wickerwork, substantially as and for the purpose described.

6. In a machine for making wickerwork, a movable frame, grippers carried by the same, guide-bars, guide-rollers, a chain led over the latter, a clamp attached to the said chain, a friction-coupling carried by one of the said guide-rollers for allowing the finished wickerwork to retreat at a slow rate, substantially as described.

7. In a machine for making wickerwork, a fixed frame, grippers carried by the same, a movable frame, grippers carried by the latter, guide-bars, guide-rollers, a chain led over the latter, a clamp attached to the said chain, a friction-coupling carried by one of the said guide-rollers, a shaft on the movable frame, and a pin on the fixed frame for imparting turning movement to the said shaft, substantially as described.

8. In a machine for making wickerwork, a fixed frame, grippers carried by the same, a movable frame, grippers carried by the latter, arms forming guides and carrying the said movable frame, a beater provided upon these arms, and an eccentric for actuating the movable frame; substantially as described.

9. In a machine for making wickerwork, a fixed frame, grippers carried by the same, a movable frame, grippers carried by the latter, arms forming guides and carrying the said movable frame, a beater provided upon these arms, a crank-disk connected with the said beater, and an eccentric for actuating the movable frame, substantially as described.

10. In a machine for making wickerwork, a fixed frame, grippers carried by the same, a movable frame, grippers carried by the latter, a plate adapted to be turned and carrying the said fixed frame; substantially as described.

11. In a machine for making wickerwork, a fixed frame, grippers carried by the same, a movable frame, grippers carried by the latter, rectangular parts, a plate adjustable on the latter, the said plate being adapted to be turned and carrying the said fixed frame; substantially as described.

12. In a machine for making wickerwork, a fixed frame, grippers carried by the same, a movable frame, grippers carried by the latter, guides, a plate provided on the said guides and adapted to be moved parallel to itself, and a plate provided on the movable plate; substantially as described.

13. In a machine for making wickerwork, a fixed frame, grippers carried by the same, a movable frame, grippers carried by the latter, guides, a plate provided on the said guides and adapted to be moved parallel to itself, a plate provided on the movable plate, and chains for imparting a slow movement to the latter plate; substantially as described.

14. In a machine for making wickerwork, a fixed frame, grippers carried by the same, a movable frame, grippers carried by the latter, guides, a plate provided on the said guides, and adapted to be moved parallel to itself, a plate provided on the movable plate, chains for imparting a slow movement to the latter plate, guide-rollers and a brake for such rollers; substantially as described.

In testimony whereof I have signed my name to this specification in the presence of two subscribing witnesses.

ARNO POHORZELECK.

Witnesses:
RUDOLPH FRICKE,
B. H. WARNER, Jr.